April 24, 1962  B. CAMETTI  3,031,593
DYNAMOELECTRIC MACHINE
Filed Oct. 18, 1956
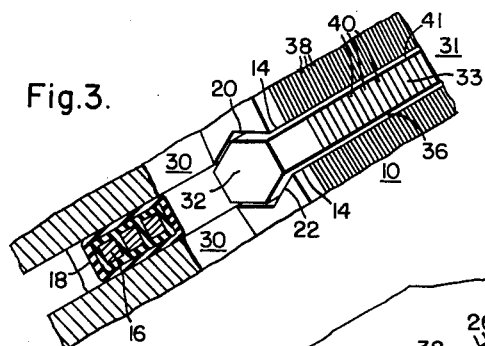
Fig.3.
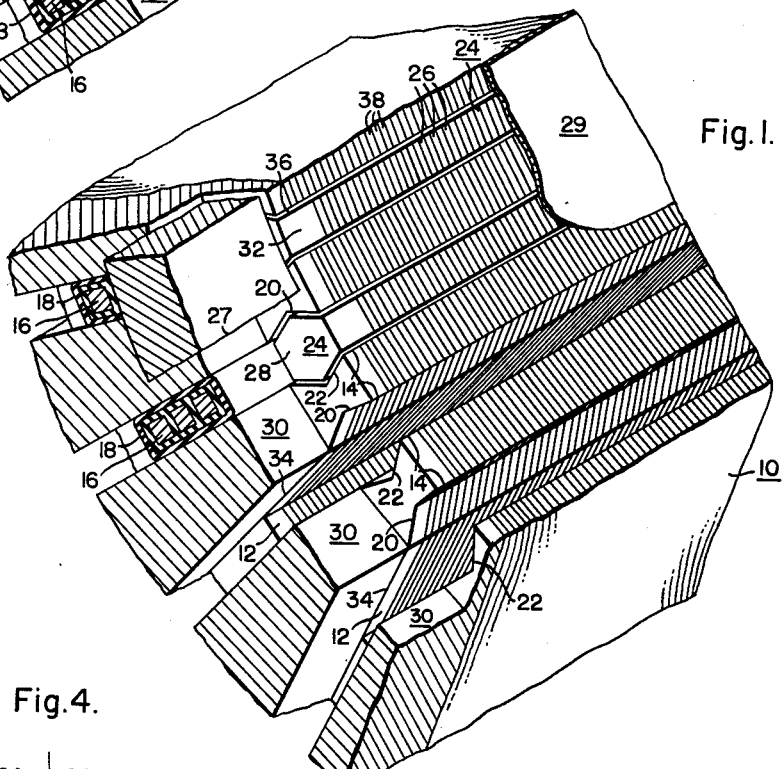
Fig.1.
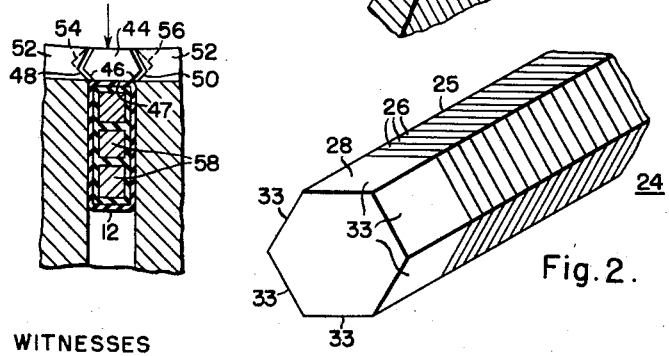
Fig.4.
Fig.2.
WITNESSES
INVENTOR
Benjamin Cametti
BY
ATTORNEY United States Patent Office 3,031,593
Patented Apr. 24, 1962

3,031,593
DYNAMOELECTRIC MACHINE
Benjamin Cametti, Forest Hills, Pa., assignor to Westinghouse Electric Corporation, East Pittsburgh, Pa., a corporation of Pennsylvania
Filed Oct. 18, 1956, Ser. No. 616,729
7 Claims. (Cl. 310—214)

The present invention relates to dynamoelectric machinery including sealed electric motors intended for operation within an enclosed fluid system, and more particularly to such a motor adapted for operation at high pressures in such systems.

Sealed electric motors of the character described customarily are furnished with the stator and rotor thereof enclosed within hermetically sealed enclosures which conform, respectively, to the circumference of the armature and to the inner periphery or bore of the stator, and which are formed from relatively thin material in order to minimize electrical losses in the motor. These motors are frequently used in an arrangement wherein a motor is permanently coupled to a pumping unit sealed within the motor-pump casing and adapted for use with fluids maintained at extremes of temperatures and pressures. In this application, a portion of similar fluid, maintained at a lower temperature to remove electrical losses in the form of heat from the motor, is circulated through the motor and is separated, by means of a suitable thermal barrier, from the pump section of the aforesaid motor-pump combination. However, in order to prevent leakage of the high temperature main fluid stream from the pump section into the motor section, the cooling fluid of the motor is maintained at the same extremely high pressure as that of the main fluid stream.

Heretofore it has been difficult to adequately support that part of the hermetically sealed enclosures covering the bore of the stator or circumference of the rotor, of the sealed motor, in a manner which will prevent the enclosure from being forced into the coil or winding slots of the stator or rotor, and the consequent rupture thereof by the pressure of the coolant circulated through the motor. By way of possible solutions to this problem it has been proposed to utilize closed slots in the stator or rotor in order to support the sealed enclosures; however, the use of closed slots not only necessitates inserting the motor windings from an end of the stator or rotor by pushing them through the slots, but also increases the electrical losses in the stator or rotor due to the continuous nature of the periphery thereof. In view of the latter consideration, it is likewise unfeasible to construct the sealed enclosures of such thickness as to bridge the stator or rotor slots opening into the gap of a conventional motor, because of the increased tendency of eddy currents to be formed within the thickened enclosures. Even in those applications wherein enclosures having comparatively thick walls may be tolerated, the extremely high pressures encountered in the aforesaid applications of such sealed motors will nevertheless force the walls of the enclosures into the slots causing either rupture thereof or undesirable compression of the stator or rotor windings and their insulation.

Accordingly, it is an object of the present invention to furnish more efficient stator and rotor arrangements adapted for use in sealed electric motors.

Another object of the invention is to facilitate winding a stator or rotor adapted for use in electric motors.

A further object of the invention is to minmize the electrical losses in a sealed motor of the character described.

Still another object of the invention is to furnish means for adequately supporting sealed stator and rotor enclosures utilized in such motors.

A still further object of the invention is to improve means for holding the windings of electric motors and the like in place within the stator and rotor slots thereof.

Yet another object of the invention is to enable such winding holding means to withstand extremely high operating pressures encountered in many applications of sealed motor-pumps and the like.

These and other objects, features and advantages of the invention will be made apparent during the ensuing description thereof taken in conjunction with the accompanying drawings wherein:

FIGURE 1 is a partial perspective view of a stator of an electric motor, the stator being constructed in accordance with the principles of this invention;

FIG. 2 is an enlarged partial perspective view of one of the supporting members shown in FIG. 1;

FIG. 3 is a partial perspective view of another stator constructed according to the teachings of this invention; and FIG. 4 is an elevational view, partly in section, of another stator constructed in a manner pursuant to the invention.

In accordance with the invention the usual stator and rotor slots opening into the bore of the stator are provided with means for receiving a keyed bridging or supporting member, also known as a slot wedge. Use of the supporting member permits the coils to be inserted from the face of the stator or rotor and to be thereafter held in place by the addition of the supporting member. The supporting member additionally functions to support the aforesaid sealed enclosures, when provided in sealed motors, respectively, covering the inner periphery or bore of the stator and the outer circumference of the rotor. The supporting member made in accordance with the invention is provided with means for reducing electrical losses therein and in the stator or rotor, as the case may be.

Referring now more particularly to the drawings the exemplary form of the invention depicted therein relates to a coil or winding structure for an electric motor, and in this example comprises a stator structure or base 10 having a plurality of coil or winding slots 12 opening into the bore of the stator, as indicated thereon by the reference character 14. Positioned within each of the slots 12, some of which are shown as vacant in the drawing for purposes of illustration, are stator coils or windings 16 covered by conventional electrical insulation indicated generally at 18. Each of the slots 12 comprises widened portions 20 and 22 formed adjacent the openings 14 thereof. Such widened portions are shaped to receive a supporting or bridging member presently to be described, and to key the member in a desired position thereof within the slots 12.

One form of the aforementioned supporting member, indicated generally at 24, comprises a stack 25 of laminae 26 secured to one another along the length of the supporting member 24. Each end of the stack of laminae 26 is terminated by end pieces or backing members 28 secured to the laminated stack 25 in order to facilitate handling of the supporting member 24 and to protect the outermost laminae 26 thereof during insertion of the member.

When inserted into the slots 12, the outward extremities of the end pieces 28 in one example of the invention are flush, as shown in FIG. 1, with the ends of the slots at either side of the stator 10 where, they are engaged by backing up sleeves 27, which are assembled adjacent the bore of the stator structure 10 at each end thereof, and upon the shoulders 30 secured to either side of the stator 10. When secured to the stator structure 10, in the conventional manner, the backing up sleeves 27 prevent separation of the laminae 26 by contacting the end pieces 28. The backing up sleeves are shown in greater detail in the copending application, Serial No. 466,247, now Patent No. 2,824,983, of B. Cametti and W. M. Wepfer, assigned to the assignee of the present application. The backing up sleeves together with the supporting members 24 are arranged to support a sealed enclosure or stator can 29. Alternatively, as illustrated in FIG. 3, supporting members 31, one being shown herein for purposes of illustration, can be provided with end pieces 32 which have sufficient length to protrude a short distance beyond the ends of the slots 12. Thus, the backing up sleeves 27 (FIG. 1) will engage the protruding end pieces 32 of the supporting members 31 and ensure the non-separation and compactness of the laminated supporting members 31, by being arranged, as in the aforesaid copending application, with the result that compressional stress is applied axially of the supporting members 31.

In one application of the invention the supporting member 24 is formed with a regular hexagonal cross section in order that the member may be inserted into the widened portions 20 and 22 of the slots 12 in a number of rotational positions of the member, with the result that a flat surface 33 of the supporting member is always presented to the interior of the stator bore. In furtherance of this purpose, the sides of each of the widened portions 20 or 22 and the openings 14 and width 34 of the bottom portions of the slots 12 are arranged to form a corresponding, regular hexagonal space, adjacent the openings of the slots, wherein the bridging or supporting members 24 are inserted after the stator windings 16 are placed in their respective slots 12. It will be readily apparent that alternatively, any well known keying means, e.g. a tongue- and groove arrangement, can be utilized to secure the bridging or supporting members 24 within the slots 12.

In other applications of the invention, such as those involving pressurized sealed motor-pumps and the like, it is desirable to provide a supporting member which possesses a minimum of radial thickness relative to the stator but which is able to withstand extreme pressures applied to the stator face without bending or breaking into the slot. Frequently, as where the supporting members are coated with a ceramic insulating material, such bending must be virtually eliminated to prevent cracking and loss of the insulating properties of the ceramic coating. In the aforesaid applications or in others wherein space between the stator slots is severely limited, it becomes important to avoid undercutting the stator teeth, as by the widened portions 20 and 22 (FIGS. 1 and 3), to any great extent.

The problems suggested above are solved, in accordance with the invention, by providing a supporting or slot closure member 44 with an inverted keystone cross section, as shown in FIG. 4. The upwardly expanding sides 46 of the member 44 are formed at such an angle that predetermined amounts of horizontal components of reactive force will be exerted oppositely in direction generally parallel to lower surface 47 of the member 44, when a load L is applied thereto. The angular disposition of the sides 46 is selected such that, when they are bearing against the lower surfaces of indentations 48 and 50 formed in the stator teeth 52, the aforesaid components produce a compressional stress adjacent the lower surface 47 of the supporting member 44 which stress equals or exceeds the bending or tensional force induced by the load L in the lower surface 47 of the supporting member. The use of comparatively short upwardly expanding sides 46, as in the keystone configuration of FIG. 4, tends to concentrate the horizontal reactive components to an area immediately adjacent the lower surface 47 of the supporting member 44. With this arrangement, bending and weakening of the material forming the supporting members 44 is eliminated. Accordingly, material such as ceramics, which have little tensional strength, can be utilized in constructing the supporting members 44.

Use of the keystone cross sectional configuration of the supporting member 44 serves an added purpose of minimizing the depth of the indentations 48 and 50 which are formed in the adjoining stator teeth 52 to receive and to key the supporting members 44 relative to the slots 12. Thus, each keystone enclosure, as determined by the indentations 48 and 50 and the width of the associated slot 12, is narrower than a keying space which would be required to accommodate a supporting member having equal upwardly and downwardly expanding sides and which is indicated partially by the dashed lines 54 and 56.

Use of the keystone configuration imparted to the supporting member 44 obviously permits use of a thinner supporting member in the radial direction, and increases the amount of space available in the slots 12 for the accommodation of the stator conductors 58. The minimum radial thickness of the supporting members 44 is determined by the area and inclination of the upwardly expanding sides 46 thereof and, of course, the total load L exerted upon the supporting member 44.

The aforesaid hexagonal space or the keystone enclosure is made larger in these arrangements than the corresponding supporting member for the purpose of facilitating insertion of the associated supporting member and to permit the use of mica, ceramic, or other type insulation in spaces 36 between the metallic laminations of the supporting or bridging members and of the stator construction 10. The employment of the laminated supporting members together with the aforesaid insulation minimizes the eddy current losses in the supporting members and the stator 10, in accordance with well-known electrical laws. Therefore, the laminae 26 of the supporting members 24 should be as thin as practical and accordingly may be as thin as laminae 38 of the stator structure 10.

In the arrangement illustrated in FIG. 3, however, laminae 40 comprising the laminated stack 41 of the supporting member 31 are made thicker than the laminae 38 of the stator 10, as the increase in electrical losses are insignificant because of the relatively small total volumes of the laminae 40. Moreover, the greater thickness of the laminae 40 not only facilitates fabrication of the bridging or supporting members 31, but additionally prevents the possibility of the laminae 40 being driven between the laminae 38 of the stator 10 (FIG. 3) under impetus of the extremely high pressures encountered in various applications of the sealed motor.

One method of fabricating the supporting member 24 includes coating either side of a metallic sheet having a thickness equal to that desired for the laminae 26 or 40 with a thin coating of a suitable high temperature cement. One such cement is phenolweld #7, manufactured by the H. V. Hardman Company of Belleville, New Jersey, and comprising a mixture of vinyl resins and phenyl formaldehyde. The laminae 26 or 40 are then die-punched from the sheet and collected in a suitable jig-enclosure (not shown) having the walls thereof conforming to the outer periphery of the supporting member 24 or 31 and additionally having such length that will determine the desired length of the supporting member. An adjustable clamp is desirably provided at an end of the jig-enclosure for applying an axial load to the laminae. After the laminae have been stacked and clamped within the enclosure as aforesaid, the enclosure and the stacked laminae are baked at a temperature sufficient to fuse the aforementioned cement. Similarly, the end pieces 28 or 32 may then be secured to the laminae 26 or 40 by applying the aforesaid cement to the end pieces 28. By adhesively securing the laminae and end pieces in the aforedescribed manner, the same can be held together at least temporarily until the supporting members 24 or 31 can be wedged within the slots 12. Obviously, the laminae 26 or 40 can be secured by other means, for an example, an insulated fastening means (not shown) passing through central apertures of the aforesaid laminae.

In the case of unusually large or long stator structures, the laminated stack 25 (FIGS. 1 and 2) or the stack 41 (FIG. 3) may comprise two or more smaller component stacks (not shown) which can be individually formed in accordance with the foregoing method. The component stacks, the outer ones of which are each provided with an end piece 28 or 32 secured to the outer extremity thereof, are then inserted tandemly into the stator slots 12.

From the foregoing description it is apparent that novel and efficient supporting means has been provided for the windings 16 and for the sealed enclosures (not shown) which customarily are provided in electric motors of the character described when such motors are utilized in hermetically sealed systems.

Although the invention has been described in detail with reference to a stator arrangement for an electric motor, it is to be understood that the principles of the invention can be applied, with equal facility, to a slotted rotor construction and the like, for use in electric motors. Obviously, the invention can be utilized to advantage in unsealed motors, having slotted stator or rotor arrangements, to secure the windings thereof in place within the stator and rotor slots thereof.

Therefore, numerous modifications of the invention exemplified herein will occur to those skilled in the art without departing from the scope of the appended claims. For example, the supporting members 44, when utilized in the slots of a rotor driven at high speeds, can be inverted relative to the position thereof shown in FIG. 4. In the inverted position, with the sides 46 of the supporting member being disposed adjacent the outer periphery of the rotor, the supporting member 44 is better able to withstand the centrifugal forces developed therein at high rotative speeds of the rotor, and bending or fracture of the supporting members 44 is eliminated.

I claim as my invention:

1. In a winding structure for a dynamoelectric machine, the combination comprising a laminated base having a plurality of winding slots opening at a surface thereof, said slots each having a keying widened portion adjacent the openings thereof, said widened portion defining a keying space of regular hexagonal cross section; and a laminated slot closure member of regular hexagonal cross section inserted into each of said widened slot portions, said keying spaces being orientated so that a flat surface of each of said closure members in any rotative position thereof is disposed substantially in the plane of the adjacent portion of said base surface and an opposite flat surface of each of said closure members is engageable with a winding mounted in the associated slot.

2. In a sealed winding structure of an electric motor, the combination comprising a base having a plurality of winding slots opening at a surface thereof, said slots each having a hexagonal keying widened portion adjacent the opening thereof; a hexagonal slot closure member inserted into each of said widened portions and conforming thereto; said keying spaces being orientated so that a flat surface of each of said closure members is disposed substantially in the plane of the adjacent portion of said base surface and an opposite flat surface of each of said closure members is engageable with a winding mounted in the associated slot, and a sealed enclosure for said winding structure, said enclosure being supported by said base surface and by said first-mentioned flat surface of each of said closure members.

3. In a winding structure for a dynamoelectric machine, the combination comprising a base having a plurality of winding slots opening at a surface thereof, said slots each having a keying widened portion adjacent the opening thereof; a supporting member inserted into each of said widened portions and conforming thereto; said supporting members each including a laminated stack and a backing member secured to each end of said stack, said backing members protruding beyond said slots; and a pair of backing-up sleeves individually secured adjacent the ends of said slots, said sleeves being in bearing contact with said backing members.

4. In a winding structure for a dynamoelectric machine, the combination comprising a laminated base having a plurality of winding slots opening at a surface thereof, said slots each having a keying widened portion adjacent the openings thereof, laminated supporting members inserted into said widened portions and conforming thereto, the laminae of said supporting members being of greater thickness than that of the laminae of said base, a backing member secured to each said supporting members, said backing members protruding beyond said slots, and a pair of backing-up sleeves secured adjacent the ends respectively of said slots, said sleeves being in bearing contact with said backing members.

5. In a sealed winding structure for a dynamoelectric machine, the combination comprising a base having a plurality of winding slots opening at a surface thereof, said slots each having a keying widened portion adjacent the opening thereof, a supporting member inserted into each of said widened portions and conforming thereto, said supporting members each including a laminated stack and a backing member secured to each end of said stack, said backing members protruding beyond said slots, a pair of backing-up sleeves individually secured adjacent the ends of said slots, said sleeves being in bearing contact with said backing members, and a sealed enclosure for said winding structure, said enclosure conforming to said base surface and to a surface of each of said supporting members.

6. In a sealed winding structure for a dynamoelectric machine, the combination comprising a laminated base having a plurality of winding slots opening at a surface thereof, said slots each having a keying widened portion adjacent the openings thereof, said widened portion defining a keying space of regular hexagonal cross section, a laminated slot closure member of regular hexagonal cross section inserted into and keyed within each of said widened slot portions, said keying spaces being orientated so that a flat surface of each of said closure members in any rotative position thereof is disposed substantially in the plane of the adjacent portion of said base surface and an opposite flat surface of each of said closure members is engageable with a winding mounted in the associated slot, and a sealed enclosure for said winding structure, said enclosure being supported by said base surface and by the first-mentioned flat surface of each said slot closure members.

7. A slot closure member adapted for insertion into a winding slot of a dynamoelectric winding structure, said slot having a keying widened portion defining a keying space of regular hexagonal configuration, said member comprising a laminated stack of regular hexagonal plates and a backing member of similar configuration secured to each end of said stack, the periphery of said backing members conforming to that of said plates, said keying space being orientated so that a flat surface of said closure member in any rotative position thereof is disposed substantially in the plane of the opening of said slot and an opposite flat surface of said closure member is engageable with a winding mounted in the associated slot.

References Cited in the file of this patent

UNITED STATES PATENTS

| 2,386,673 | Fisher | Oct. 9, 1945 |
| 2,484,007 | Atwell | Oct. 11, 1949 |
| 2,562,283 | Sawyer | July 31, 1951 |
| 2,745,030 | Baldwin | May 8, 1956 |
| 2,761,985 | Schaefer | Sept. 4, 1956 |

FOREIGN PATENTS

| 46,299 | Sweden | Dec. 31, 1919 |
| 58,041 | Austria | Mar. 10, 1913 |
| 190,521 | Great Britain | Dec. 18, 1922 |
| 286,765 | Germany | Aug. 30, 1915 |